(12) United States Patent
Kehl

(10) Patent No.: US 12,005,474 B2
(45) Date of Patent: Jun. 11, 2024

(54) ADHESIVE DISPENSING NOZZLE

(71) Applicant: Harrington & Associates, Inc., Indianapolis, IN (US)

(72) Inventor: Floyd L. Kehl, Indianapolis, IN (US)

(73) Assignee: Harrington & Associates, Inc., Indianapolis, IN (US)

( * ) Notice: Subject to any disclaimer, the term of this patent is extended or adjusted under 35 U.S.C. 154(b) by 285 days.

(21) Appl. No.: 17/650,962

(22) Filed: Feb. 14, 2022

(65) Prior Publication Data

US 2022/0258197 A1    Aug. 18, 2022

Related U.S. Application Data (60) Provisional application No. 63/200,112, filed on Feb. 15, 2021.

(51) Int. Cl.
| | |
|---|---|
| *B05C 5/02* | (2006.01) |
| *B05B 1/14* | (2006.01) |
| *B05B 1/30* | (2006.01) |

(52) U.S. Cl.
CPC .............. *B05C 5/0291* (2013.01); *B05B 1/14* (2013.01); *B05B 1/3026* (2013.01); *B05C 5/0229* (2013.01)

(58) Field of Classification Search
CPC ... B05C 5/0291; B05C 5/0229; B05C 5/0237; B05C 5/027; B05C 5/0279; B05C 11/1034; B05B 1/14; B05B 1/3026; B05B 15/16; H01M 50/00
See application file for complete search history.

(56) References Cited

U.S. PATENT DOCUMENTS

| | | | |
|---|---|---|---|
| 4,911,956 A | 3/1990 | Gabryszewski et al. | |
| 6,676,038 B2* | 1/2004 | Gressett, Jr. | ............ B05B 15/65 239/296 |
| 7,637,592 B2 | 12/2009 | Rosenblum et al. | |
| 7,980,197 B2 | 7/2011 | Prentice et al. | |
| 7,997,689 B2 | 8/2011 | Peng et al. | |
| 8,061,564 B2* | 11/2011 | Frates | ................... B05C 5/0237 239/296 |
| 8,524,327 B2 | 9/2013 | Wanthal | |
| 8,550,381 B2* | 10/2013 | Burmester | ............. D01D 4/025 239/296 |
| 10,160,577 B2 | 12/2018 | Decock et al. | |
| 10,363,568 B2 | 7/2019 | Clark et al. | |
| 10,661,296 B2 | 5/2020 | Urquhart et al. | |
| 2007/0125888 A1 | 6/2007 | Zillig et al. | |
| 2017/0128968 A1 | 5/2017 | Adams et al. | |

\* cited by examiner

*Primary Examiner* — Vishal Pancholi (74) *Attorney, Agent, or Firm* — Woodard, Emhardt, Henry, Reeves & Wagner, LLP (57) ABSTRACT

A dispensing unit for an adhesive or other viscous liquid includes one or more dispensing nozzles for delivery of the adhesive to a desired surface. The dispensing nozzles each include one or more dispensing ports that are in fluid communication with a nozzle body recess defined through a nozzle body of the dispensing nozzle. Adhesive that is supplied to the nozzle body recess may be thrown laterally from the dispensing nozzle via the dispensing ports. Each of the dispensing ports may be positioned between a pair of projections. The projections protect the dispensing port from breaking due to contact with the surface on which the adhesive is applied or contact with another exterior object.

20 Claims, 12 Drawing Sheets

ADHESIVE DISPENSING NOZZLE

CROSS REFERENCE TO RELATED APPLICATIONS

The present patent document claims the benefit of the filing date of Provisional U.S. Patent Application No. 63/200,112, filed on Feb. 15, 2021, which is hereby incorporated by reference in its entirety.

FIELD OF THE INVENTION

The present disclosure deals with a nozzle for dispensing adhesive.

BACKGROUND

There are many situations where it may be desired to accurately and quickly apply adhesive to a surface. This process may be automatized by using an adhesive dispenser with nozzles for dispensing the adhesive. However, in some applications, the application of adhesive onto the desired surface may require an accuracy in both amount and location that is difficult to achieve without manual application. Typical adhesive dispensing devices have difficulty with stopping and starting the application of adhesive to control the amount of adhesive that is applied to the desired surface. Additionally, the nozzles for dispensing adhesives from these dispensing devices can easily become clogged from the adhesive which the nozzles are trying to supply.

Thus, there is a need for improvement in this field.

SUMMARY

Certain embodiments include a dispensing unit for dispensing a viscous liquid, such as an adhesive. The dispensing unit includes a frame and a valve mounting bracket. The dispensing unit also includes one or more dispensing nozzles that are supplied with a liquid to be dispensed by a supply tube.

The dispensing nozzles include a nozzle body that defines a nozzle body recess for receiving the liquid to be dispensed from the supply tube. One end of the nozzle body includes a base portion that is coupled to a nozzle base plate. The nozzle base plate is configured to be attachable to a frame of the dispensing unit. The other end of the nozzle body includes a dispensing portion. One or more dispensing ports are defined in the dispensing portion of the dispensing nozzle. In some examples, these dispensing ports may be used to dispense an adhesive. Optionally, projections are positioned adjacent to each of the exterior ends of the dispensing ports to protect the dispensing ports from damage due to contact with an external surface. In some examples, each dispensing port is located between at least two of the projections and the dispensing ports extend from the nozzle body at a distance that is at least equal to a distance that the adjacent projections extend from the nozzle body.

The one or more dispensing ports are configured to dispense liquid from the nozzle body recess onto a surface or substrate. Each of the dispensing ports includes an interior end that is in fluid communication with the nozzle body recess and an exterior end that is in fluid communication with the environment exterior to the dispensing nozzle. In some embodiments, the exterior ends of the dispensing ports have a sharpened, tapered portion to assist the adhesive in separating from the port and correspondingly preventing the adhesive from sticking on and clogging the dispensing port.

In some embodiments, the dispensing nozzle may be in fluid communication with a metering valve that is capable of supplying a predetermined amount of adhesive to the dispensing nozzle. When dispensed, this predetermined amount of adhesive is distributed to each of the dispensing ports and thrown from the exterior end of the dispensing ports in discrete droplets onto a desired surface. In some embodiments, the metering valve may be arranged to provide less than 0.20 $cm^3$ of adhesive to each dispensing nozzle per cycle of adhesive application. In further aspects, adhesive is supplied to the dispensing nozzles through the use of one or more adhesive supply tubes.

In some embodiments, a pressure source is in communication with the nozzle body recesses of the dispensing nozzles. The pressure source may be capable of applying pressure to the nozzle body recesses. The dispensing nozzles dispense a discrete amount of adhesive as discrete droplets from the adhesive dispensing ports onto a substrate upon application of pressure from the pressure source within the nozzle body recess.

In further aspects, a method of dispensing adhesive is described. The method includes supplying a discrete amount of adhesive to a plurality of dispensing nozzles. Each dispensing nozzle includes a nozzle body recess defined through a nozzle body. Each nozzle body includes a plurality of adhesive dispensing ports extending from the nozzle body, and a plurality of projections extending from the nozzle body. Each of the adhesive dispensing ports is positioned between at least two of the projections.

Next, pressure is applied to the adhesive within the nozzle body recess to dispense the discrete amount of adhesive from the plurality of adhesive dispensing ports of the nozzle bodies. Application of pressure is stopped when the discrete amount of adhesive has been dispensed from the dispensing nozzles. The adhesive is dispensed from the plurality of adhesive dispensing ports in discrete droplets, and the adhesive is dispensed laterally relative to a longitudinal axis of the nozzle body.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The present disclosure pertains generally to the field of dispensing nozzles and more generally to a nozzle for dispensing a viscous liquid, such as an adhesive. In certain embodiments, a dispensing unit includes multiple dispensing nozzles arranged in a predetermined array to apply a liquid, such as adhesive, to a desired surface or to multiple surfaces as required. In certain embodiments, the dispensing nozzle may be configured to throw adhesive on the sidewall of a recess for receiving a battery cell. The dispensing nozzle is designed to throw the adhesive as discrete droplets that separate from and do not stick to the dispensing nozzle, so that the adhesive does not clog the nozzle in subsequent applications of adhesive.

Each dispensing nozzle includes a nozzle body that has a base portion at one end that is coupled to a nozzle base plate. The other end of the nozzle body includes a dispensing portion that includes one or more dispensing ports arranged near the end of the nozzle body. Projections may be positioned between adjacent dispensing ports to protect the dispensing ports from breaking due to contact with an application surface or another type of surface. The dispensing ports allow for delivery of the adhesive from the nozzle to the desired surface. In some embodiments, a portion of the nozzle body may not include dispensing ports so that the corresponding portion of the desired surface does not receive adhesive. In one particular example, the dispensing ports are needles that fixed in a semi-circular shape to protrude around the circumference of the tip of the nozzle. The needles may be ground at their outer ends to a sharp point that assists with the formation and separation of the droplets when thrown from the dispensing nozzle.

Figure 1:
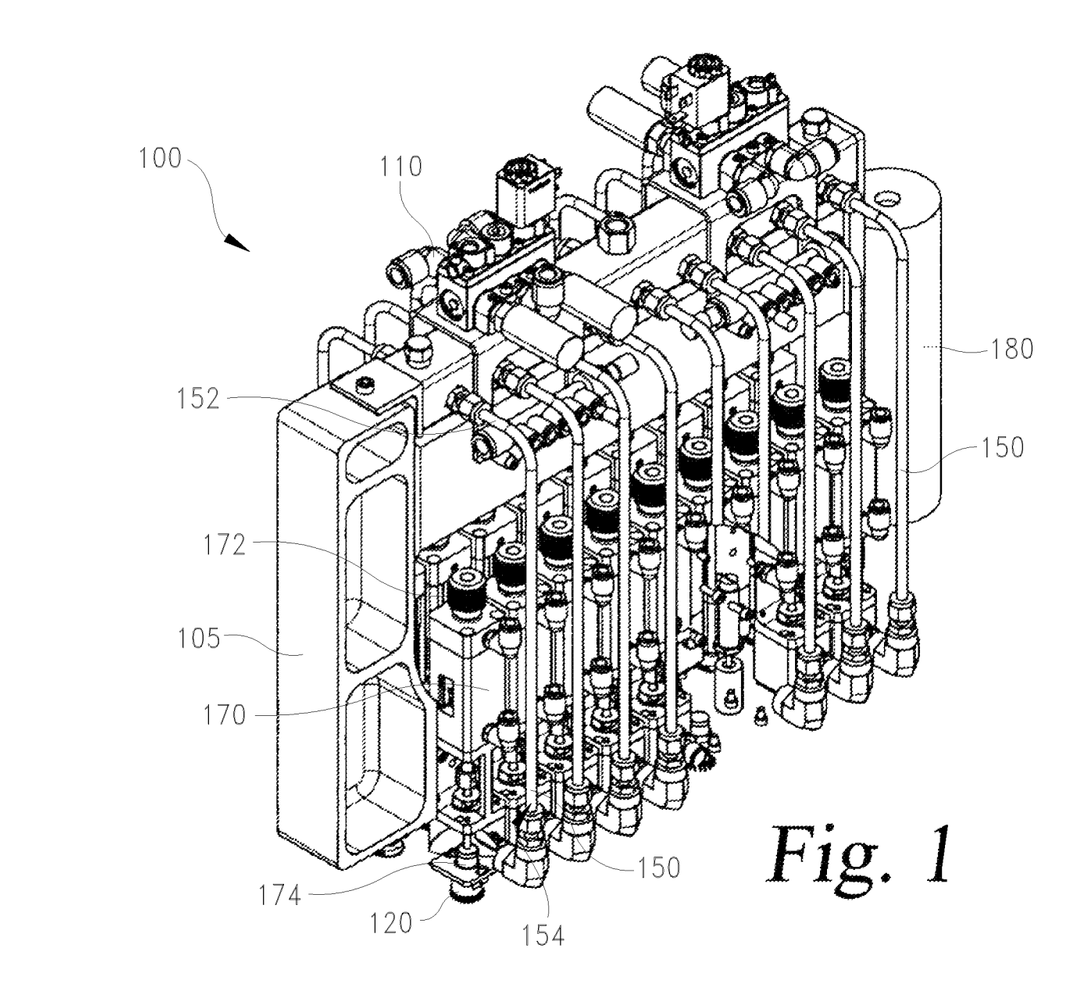
FIG. 1 is a perspective view of a dispensing unit.

FIG. 1 is a perspective view of a dispensing unit 100 for dispensing a liquid. In some embodiments, the liquid may be a viscous liquid, such as an adhesive. The dispensing unit 100 includes a frame 105 and a pneumatic valve mounting bracket 110 attached to a top surface of the frame. One or more dispensing nozzles 120 are mounted to and supported by the frame 105 of the dispensing unit 100. In the embodiment shown, the dispensing nozzles 120 are mounted to the frame 105 in two columns on opposing sides of frame 105. Several of the dispensing nozzles on the visible side have been removed in FIG. 1 for ease of illustration, to show the multiple columns of dispensing nozzles 120.

Each of the dispensing nozzles 120 is supplied with an adhesive by an adhesive supply tube 150. A supply end 152 of the adhesive supply tube is connected to a supply of adhesive and a nozzle end 154 is in fluid communication with a corresponding adhesive dispensing nozzle 120. The adhesive may be supplied under pressure. In some embodiments, the adhesive supply tube 150 may be made from stainless steel, but in other embodiments, the adhesive supply tube 150 may be made from any other suitable material.

Each of the dispensing nozzles 120 may be in fluid communication with a valve, such as a metering valve 170, that is capable of supplying a discrete amount of the adhesive or other type of fluid to be dispensed from the dispensing nozzle 120. The metering valve 170 may include a metering valve adjustment knob 172 that allows the amount of adhesive supplied to each of the dispensing nozzles 120 to be controlled. The metering valve 170 also includes a metering valve supply 174 that interfaces with the dispensing nozzle 120. Adhesive from the adhesive supply tube 150 may be provided to the metering valve supply 174. A pressure source, such as an air reservoir 180, is attached at one side of the frame 105 and acts as an air supply for providing pressurized air to trigger the metering valves 170, typically simultaneously, and to cause the adhesive stored within the metering valve supply to be dispensed. In other embodiments, other suitable methods of triggering the metering valves 170 may be used. For example, an electrical signal may be used to trigger the metering valves 170.

Figure 2:
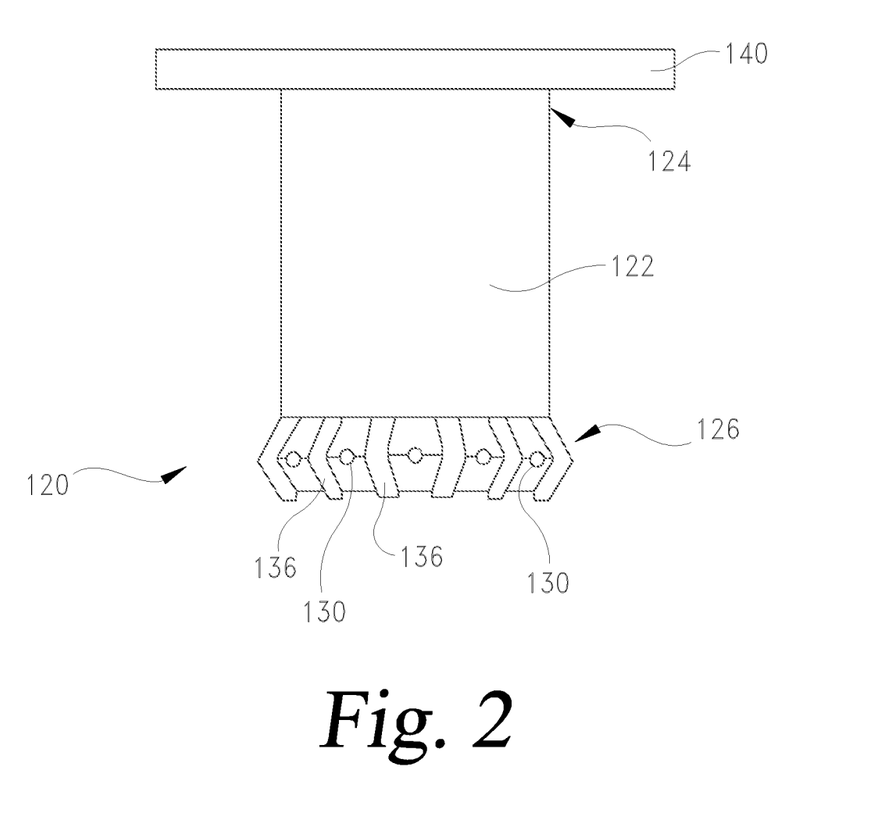
FIG. 2 is a front elevation view of a dispensing nozzle of the dispensing unit of FIG. 1.

A front elevation view of one of the dispensing nozzles 120 is illustrated in FIG. 2. As shown, the dispensing nozzle 120 includes a nozzle body 122. In the embodiment shown, the nozzle body 122 has a cylindrical shape, but in other embodiments, the nozzle body 122 may have another shape as desired. Changing the shape of the nozzle body 122 may have the effect of modifying the arrangement of the adhesive that is dispensed by the dispensing nozzle 120 by allowing the shape of an array of dispensing ports to be changed as desired.

The nozzle body 122 includes a base portion 124 at one end that is coupled to a nozzle base plate 140. A dispensing portion 126 is positioned at the opposite end of the nozzle body 122. The dispensing portion 126 includes dispensing ports 130 that are arranged on the nozzle body 122. The dispensing ports 130 may be any feature that allows adhesive supplied to the dispensing nozzle 120 to be dispensed on a desired substrate. The dispensing ports 130 are separated from each other by protrusions that extend from the dispensing portion 126 of the nozzle body 122.

Figure 3:
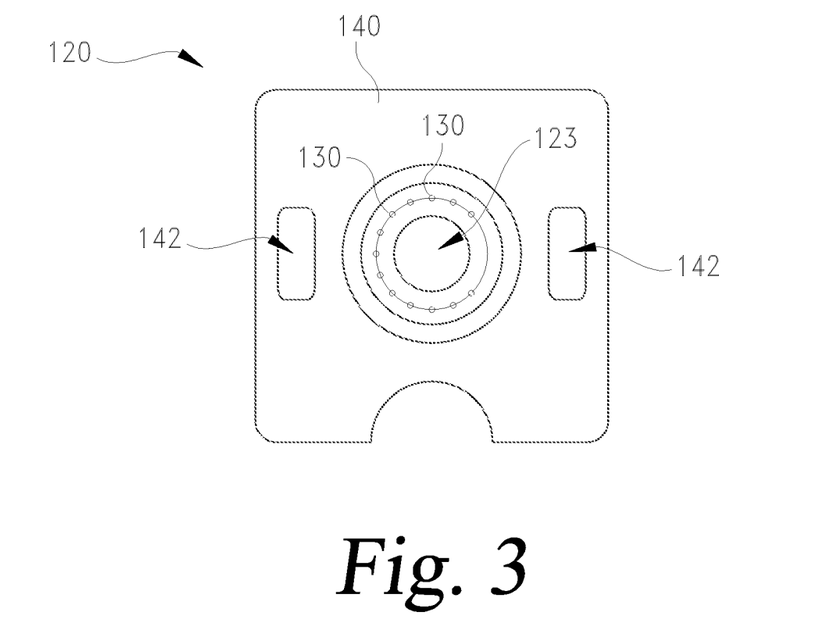
FIG. 3 is a top plan view of the dispensing nozzle of FIG. 2.

A top view of the dispensing nozzle 120 is shown in FIG. 3. As shown, the base plate 140 may define attachment apertures 142 (see FIGS. 4 and 5) for coupling the dispensing nozzle 120 to the frame 105 of the dispensing unit 100 by attachment at the base plate 140 through the attachment aperture 142. The nozzle body 122 is hollow and defines a nozzle body recess 123. An end of each of the dispensing ports 130 is in fluid communication with the nozzle body recess 123.

Figure 4:
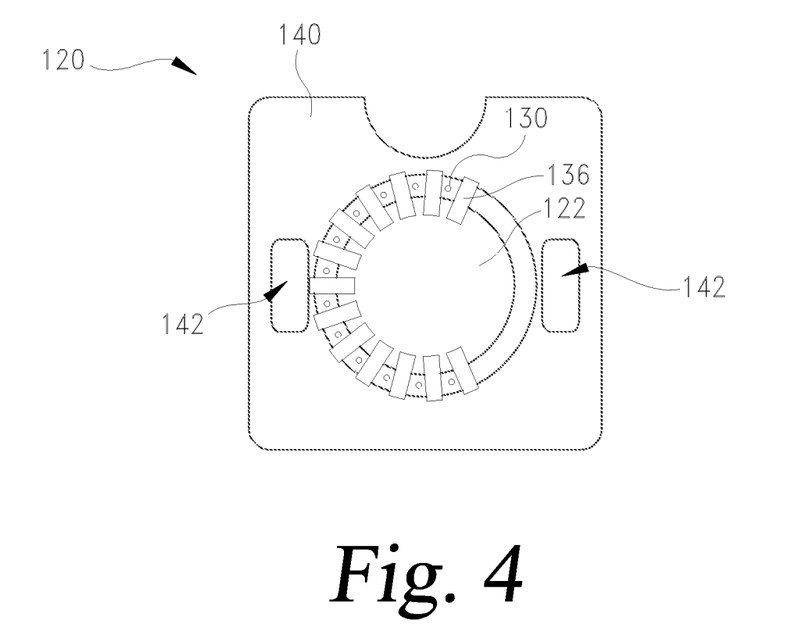
FIG. 4 is a bottom plan view of the dispensing nozzle of FIG. 2.

A bottom view of the dispensing nozzle 120 is illustrated in FIG. 4. In this embodiment of the dispensing nozzle, each of the dispensing ports 130 extending from the nozzle body 122 is positioned between adjacent projections 136. Therefore, the dispensing nozzle includes one more projection 136 than dispensing port 130. As an example, in the embodiment shown in FIG. 4, there are 13 dispensing ports 130 and 14 projections 136. Each dispensing port 130 includes an adjacent projection 136 on the left side of the dispensing port 130 and an adjacent projection 136 on the right side of the dispensing port 130.

In some embodiments, the projections 136 may be integral with and made from the same material as the nozzle body 122, for example a metal such as stainless steel or another suitable material. In other embodiments, the projections 136 may be made of a different material than the nozzle body 122 and attached to the nozzle body 122. For example, the projections 136 may be made of a stronger material than the nozzle body 122 to further be able to withstand any possible impact with a substrate or other surface.

In the embodiment shown, the dispensing ports 130 are arranged in a semi-circular shape around the dispensing portion 126 of the nozzle. However, in other embodiments, the dispensing ports 130 may be arranged in a different arrangement as desired for applying adhesive to a substrate. For example, the dispensing ports 130 may be arranged in a full circular orientation, or, in other embodiments, the dispensing ports 130 may be arranged in a linear orientation on nozzle body 122. Additionally, the number of dispensing ports 130 on nozzle body 122 may be increased or decreased as desired.

Figure 5:
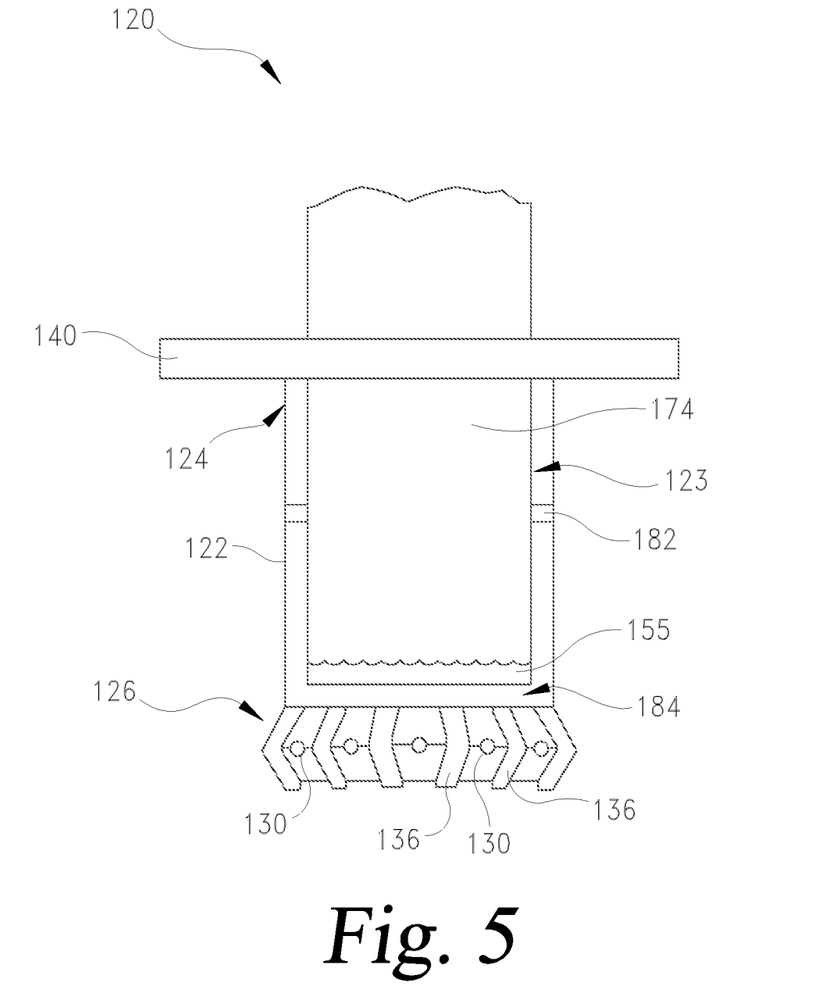
FIG. 5 is a partial cross-section view of the dispensing nozzle of FIG. 2.

A front view of the dispensing nozzle 120 with the nozzle body 122 shown in cross-section is illustrated in FIG. 5. The nozzle body recess 123 defined by the nozzle body 122 is configured to receive the metering valve supply 174 of the metering valve 170. A discrete amount of adhesive 155 from the adhesive supply tube 150 is provided to the metering valve supply 174 and the adhesive 155 is held within the metering valve supply 174 until the metering valve 170 is activated by pressurized air form the air reservoir 180. Upon activation of the metering valve 170, the adhesive 150 is expelled from the metering valve supply 174 into an entrained volume 184 within the nozzle body recess 123. A seal 182, such as an O-ring or other suitable device, may be inserted between the nozzle body 122 and the metering valve supply to enclose the entrained volume 184. The adhesive 155 is then dispensed from the nozzle body recess 123 through the dispensing ports 130.

Figure 6:
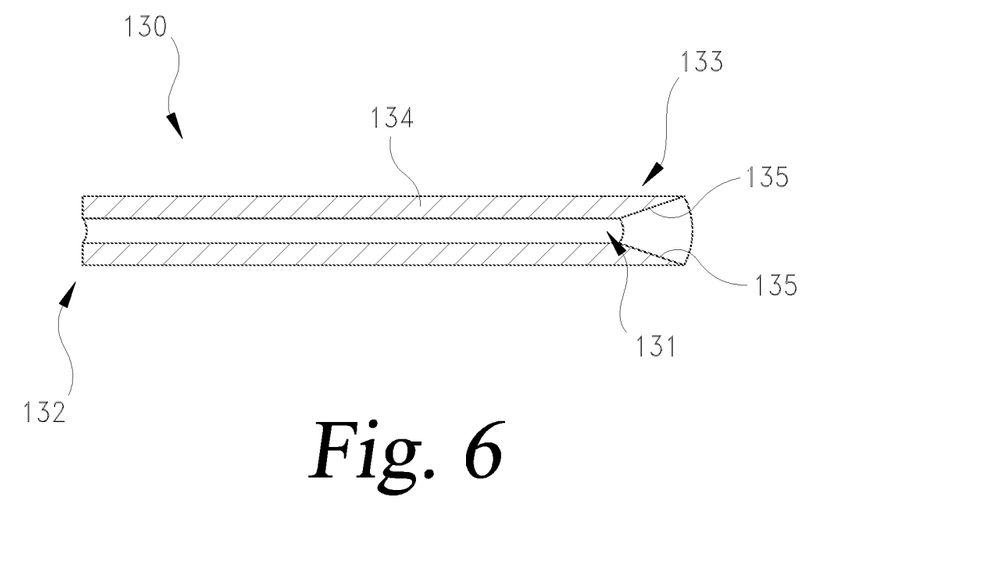
FIG. 6 is a cross-sectional side view of a dispensing port of the dispensing nozzle of FIG. 2.

As shown in the representative embodiment of a dispensing port 130 shown in FIG. 6, each dispensing port 130 defines a dispensing port opening 131 that extends through the length of the dispensing port 130. The dispensing port 130 includes an interior end 132 and an exterior end 133. In the embodiment shown in FIG. 6, the dispensing port 130 is shaped like a needle, so that dispensing port includes a cylindrical outer wall 134 that surrounds the dispensing port opening 131. The interior end 132 of the dispensing port 130 is rounded to form a circular cross-section. The exterior end 133 of the dispensing port 130 comes to a circular, sharpened point.

At the exterior end 133, the outer wall 134 of the dispensing port 130 may be ground in the interior side so that a tapered portion 135 of the outer wall 134 is formed to create the sharpened point of the exterior end 133. The interior tapered portion 135 of the outer wall 134 creates an expansion of the dispensing port opening 131 in a cone shape at the exterior end 133 of the dispensing port 130.

The sharpened/tapered point of the exterior end 133 of the dispensing port 130 may assist in preventing adhesive dispensed from the dispensing port 130 from remaining on the exterior end 133 and potentially clogging the dispensing port 130. However, in other embodiments, the dispensing port 130 may have any other shape as desired that allows the passage of adhesive introduced through the nozzle body recess 123 to be dispensed exteriorly from the dispensing nozzle 120. As an example, the dispensing port 130 may have a cylindrical shape with a continuously circular cross-section, or the dispensing port may have a square or a triangular cross-section.

Figure 7A:
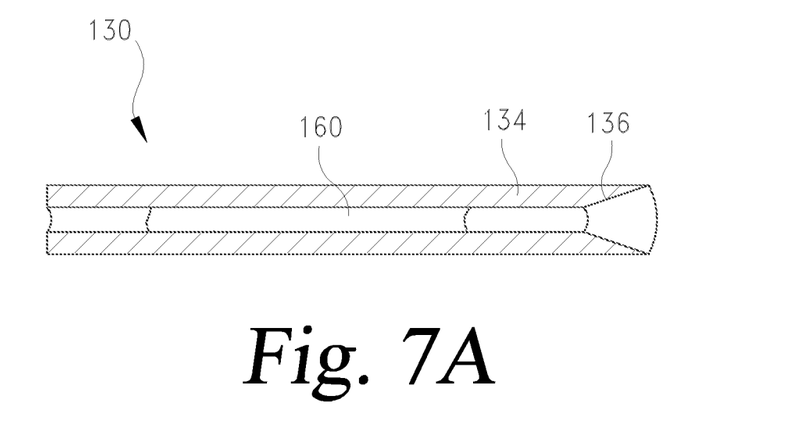
FIG. 7A is a cross-sectional side view of the dispensing port of FIG. 6 with a discrete amount of adhesive within the dispensing port.
Figure 7B:
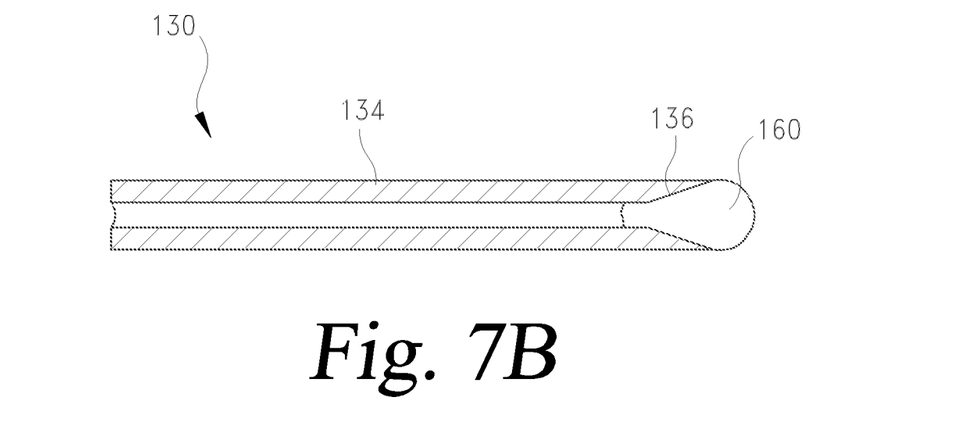
FIG. 7B is a cross-sectional side view of the dispensing port of FIG. 7A with the discrete amount of adhesive within the tapered portion dispensing port.
Figure 7C:
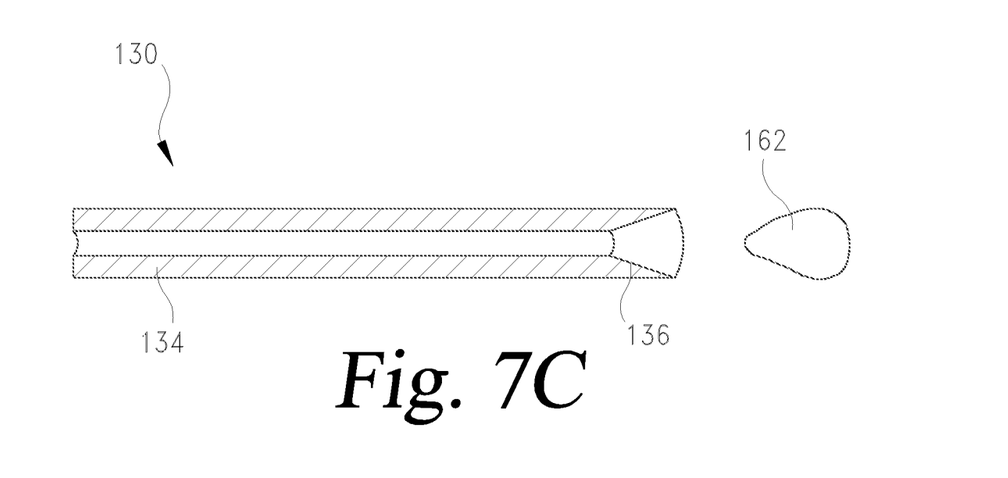
FIG. 7C is a cross-sectional side view of the dispensing port of FIG. 7A with a discrete amount of adhesive dispensed from the dispensing port in a discrete droplet.

The dispensing ports 130 operate to dispense droplets from the dispensing nozzle 120 as shown in FIGS. 7A-7C. A discrete amount of adhesive 160 from the adhesive 155 supplied to the entrained volume 184 of the nozzle body recess 123 is provided to the dispensing port 130 upon operation of the metering valve 170. The discrete amount of adhesive 160 is pushed through the dispensing port 130 to the tapered portion 135 of the outer wall 134 of the dispensing port 130. As shown in FIG. 7B, the tapered portion 135 of the outer wall 134 assists to form the discrete amount of adhesive 160 into a droplet 162 of adhesive and to assist it to separate from the port. As illustrated in FIG. 7C, the adhesive is dispensed from the dispensing port 130 as a droplet 162, leaving little to no adhesive 160 on the dispensing port 130.

Figure 8:
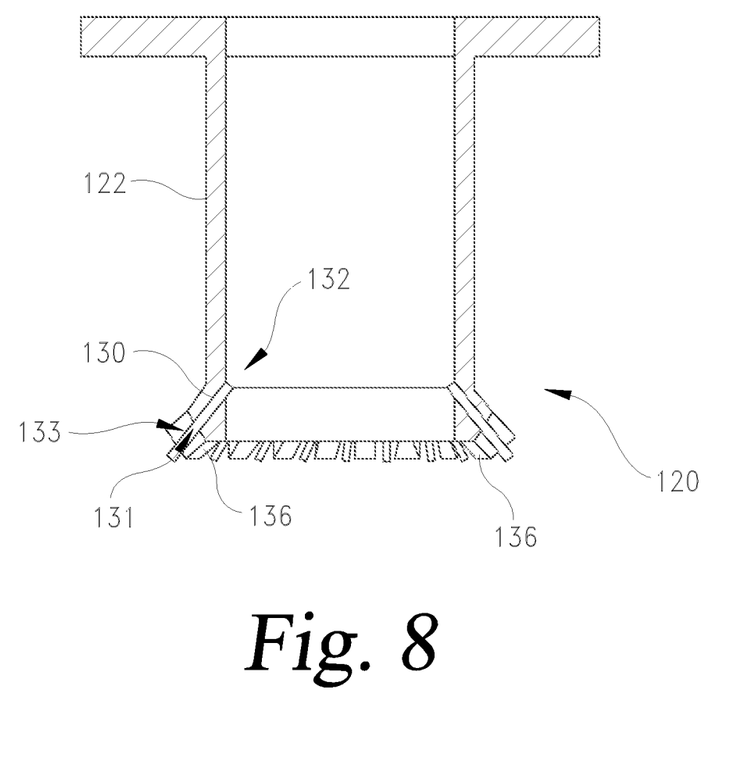
FIG. 8 is a cross-sectional front view of the dispensing nozzle of FIG. 2.

A cross-sectional view of the dispensing nozzle 120 is illustrated in FIG. 8. As shown, the interior end 132 of the dispensing port 130 is positioned to be in fluid communication with the nozzle body recess 123, allowing fluid from the nozzle body recess 123 to be introduced into the dispensing port opening 131. The exterior end 133 of the dispensing port 130 is positioned to be in fluid communication with the environment exterior to the nozzle body 122. This arrangement allows adhesive that is inserted into the nozzle body recess 123 to be ejected from the nozzle body recess 123 by the use of pressure or another suitable method. The adhesive is pushed by the air pressure through the interior end 132 of the dispensing port 130, travels through the dispensing port opening 131, and is then thrown from the exterior end 133 of the needle onto a desired substrate.

In certain embodiments, as illustrated in FIG. 8, the exterior ends 133 of each of the dispensing ports 130 extends from the nozzle body 122 a distance that is substantially equal to or slightly greater than the distance that the projections 136 extend from the nozzle body 122. This allows the projections 136 to provide some protection to the dispensing ports 130 from damage due to contact with an external surface during application of an adhesive. However, because the dispensing ports 130 extend slightly further than the projections 136, adhesive dispensed from the dispensing ports 130 is minimized from getting stuck on the projections 136 and clogging the dispensing ports 130.

Figure 9:
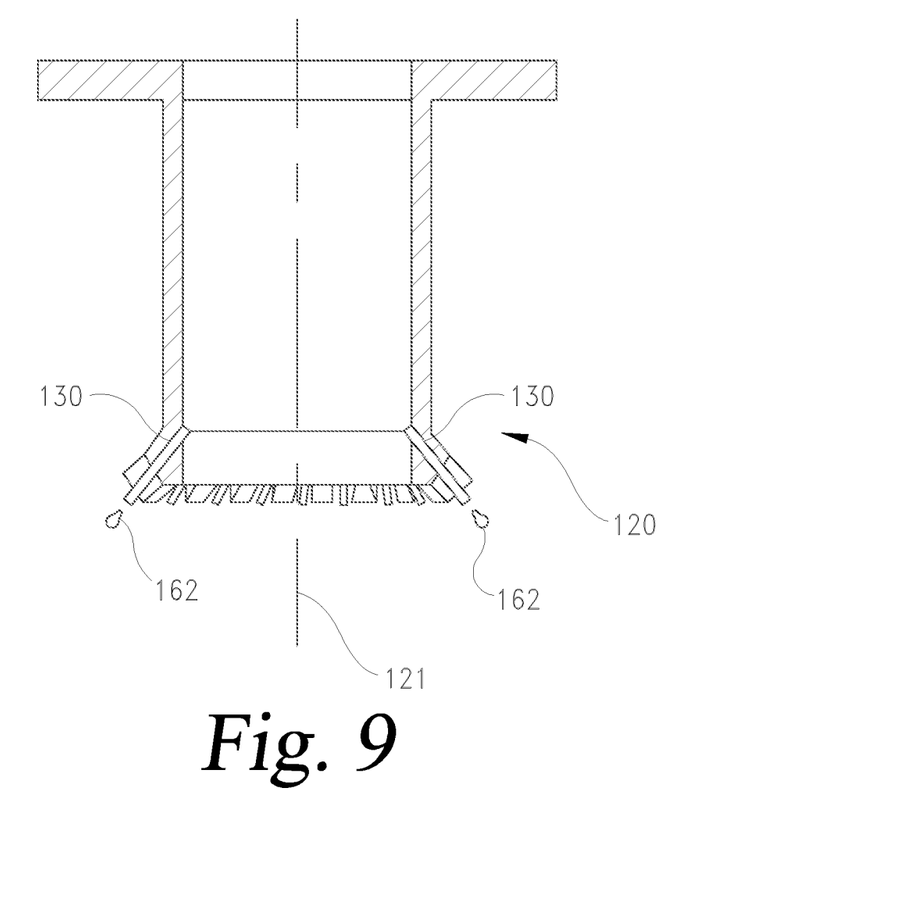
FIG. 9 is a cross-sectional front view of the dispensing nozzle of FIG. 2 showing droplets of adhesive being thrown from the dispensing nozzle.

As shown in FIG. 9, discrete droplets 162 of adhesive may be thrown from the exterior end of the dispensing port 130. These discrete droplets 162 are thrown laterally relative to a longitudinal axis 121 of the nozzle body 122. Rather than being thrown in a direction that is parallel to the longitudinal axis 121 of the nozzle body 122, the droplets 162 are thrown at an oblique angle so that the droplets 162 are directed laterally, to the sides of the nozzle body 122.

In some examples, the metering valve 170 is capable of providing 0.10 $cm^3$ of adhesive to the nozzle body recess 123 of the dispensing nozzle 120. Therefore, when the dispensing nozzle 120 includes a total of 13 dispensing ports 130, each dispensing port 130 dispenses approximately 0.0077 $cm^3$ of adhesive. In other embodiments, greater or smaller amounts of adhesive may be provided to the nozzle body recess 123, such as 0.05 $cm^3$, 0.20 $cm^3$, or 0.30 $cm^3$.

The metering valve 170 may be triggered by an application of pressure to the metering valve 170, causing the adhesive to be released from the dispensing nozzle 120 through the dispensing ports 130 and onto a desired substrate. The dispensing nozzle 120 may dispense substantially the entire amount of adhesive supplied by the metering valve 170 in a single cycle. To start another cycle of dispensing adhesive, the metering valve 170 may be activated again to provide the dispensing nozzle 120 with an additional discrete amount of adhesive to be dispensed by the dispensing nozzle 120.

Figure 10:
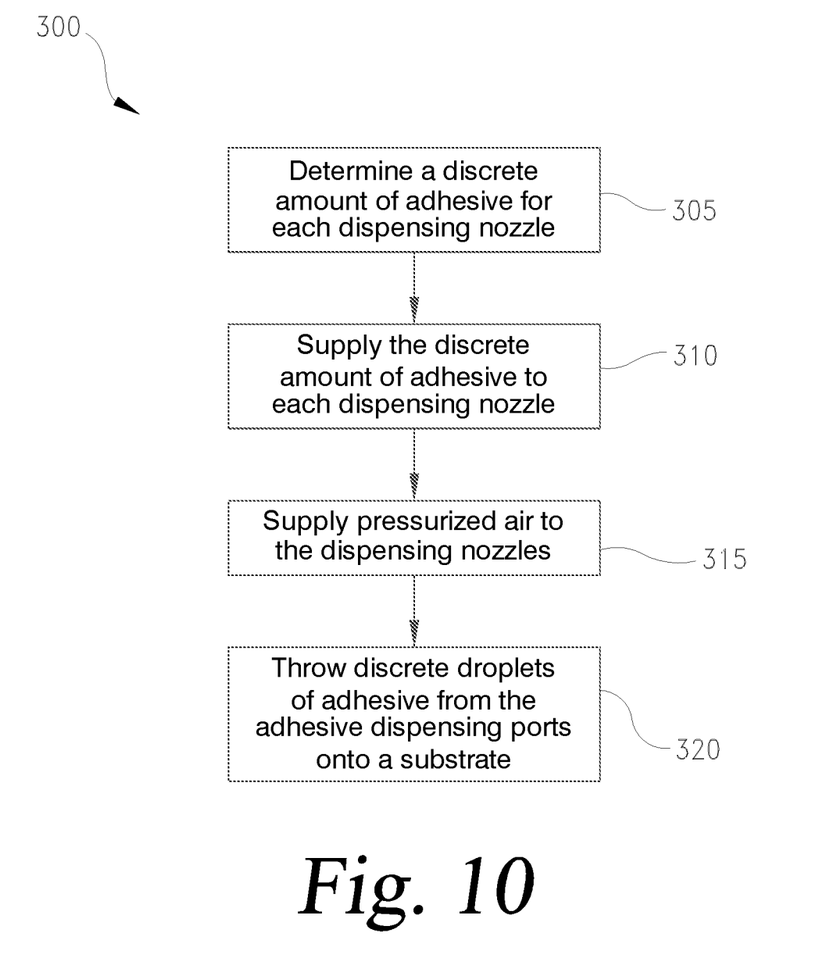
FIG. 10 is a flowchart describing a method of applying adhesive to a substrate

The dispensing unit 100 operates as described in the flowchart 300 illustrated in FIG. 10. In a first stage 305, a discrete amount of adhesive for each dispensing nozzle 120 is determined. A metering valve 170 is used to provide a predetermined, discrete amount of adhesive to the nozzle body recess 123 of the dispensing nozzle 120. In a second stage 310, adhesive is supplied to each of the nozzle body recess 123 of the dispensing nozzles 120 of the dispensing unit 100. In some embodiments, the adhesive may be supplied through the adhesive supply tube 150 and the adhesive from the adhesive supply tube 150 is supplied to the metering valve supply 174.

In a third stage 315, pressure is applied to each dispensing nozzle. In some embodiments, the pressure is applied to the adhesive within the metering valve supply 174 so that the adhesive is pushed into the nozzle body recess 123 of each of the dispensing nozzles 120. The pressure applied to the adhesive may be triggered by metering valve 170. For example, air pressure may be used to trigger the metering valve 170, which in turn applies pressure to the adhesive held in the metering valve supply 174. In some embodiments, the pressure applied to the adhesive may be from mechanical pressure; however, in other embodiments other suitable forms of pressure, such as air pressure may be used. This pressure is also applied within the nozzle body recess 123 to push the adhesive in the nozzle body recess 123 through the dispensing ports 130 of the dispensing nozzle 120. The adhesive within the nozzle body recess 123 is distributed to each of the dispensing ports 130 so that each dispensing port 130 dispenses a portion of the total amount of adhesive held within the nozzle body recess 123.

In a fourth stage 320, the adhesive is dispensed or thrown from the dispensing ports 130 in discrete droplets across a gap onto a substrate exterior the dispensing nozzle. The expulsion of the adhesive as a droplet rather than in a continuous spray helps to prevent the adhesive from sticking on the dispensing port 130 and the dispensing nozzle 120 and potentially blocking future release of adhesive. As shown in FIG. 9, described above, in some embodiments, the discrete droplets of adhesive may be thrown laterally from the dispensing nozzle 120 with respect to a longitudinal axis 121 defined through the nozzle body 122.

After substantially all of the adhesive has been dispensed from the dispensing nozzles 120, application of pressure to the dispensing nozzles is stopped to complete a cycle of applying adhesive. After application of pressure has been stopped, the substrate to which adhesive has been applied may be moved to allow adhesive to be dispensed onto a different portion of the substrate, or the substrate may be removed and replaced with a new substrate. A new cycle of application of the adhesive may begin by repeating the process described in flowchart 300.

Figure 11:
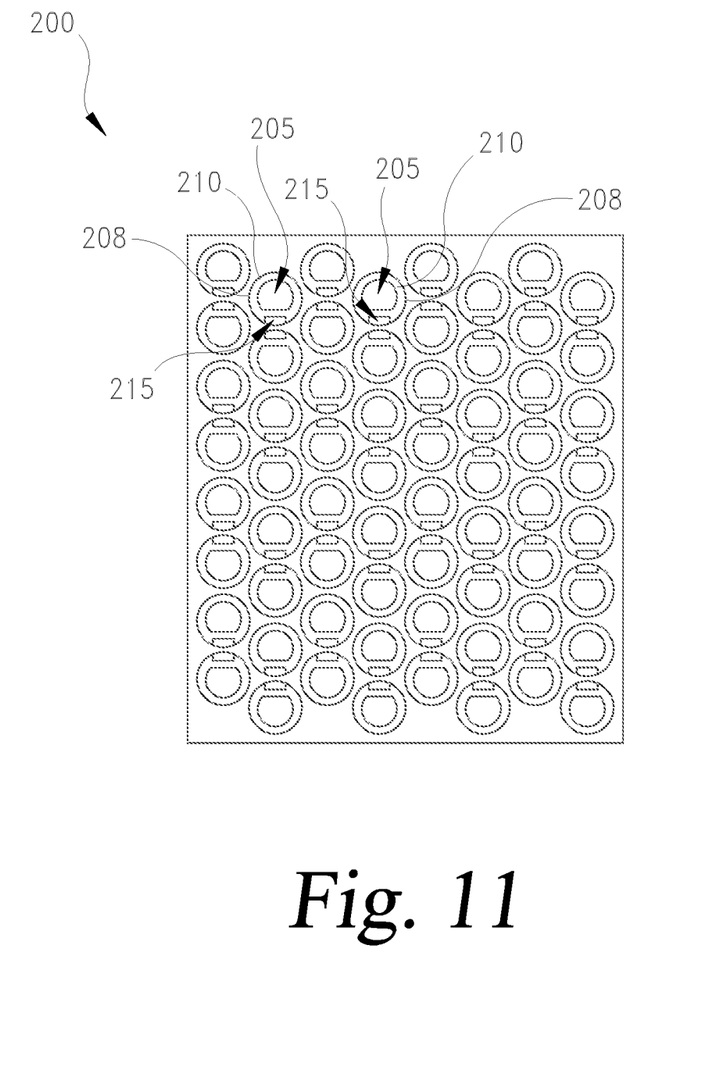
FIG. 11 is a top plan view of a tray for a battery cell array for application of adhesive from the dispensing unit of FIG. 1.

In one exemplary embodiment, shown in FIG. 11, the dispensing unit 100 may be used to add adhesive to a tray 200 for holding battery cells for a battery cell array. The tray 200 defines battery cell recesses 205 that extend at least partially through the tray 200 and are configured to receive individual battery cells. Each of the battery cell recesses 205 include a sidewall 208 that defines the outer edge of the battery cell recess 205. A ledge 210 extends from the bottom edge of the battery cell recess 205 and acts as a support surface for holding the battery cell that is inserted into the battery cell recess 205. A terminal opening 215 is defined through a portion of the ledge 210 to allow the battery cell inserted into the battery cell recess 205 to be connected to a battery terminal.

In the embodiment shown, the tray 200 includes eight columns of battery cell recesses 205, with eight battery cell recesses 205 in each column. This allows the tray 200 to hold a total of 64 battery cells. However, in other embodiments, there may be more less columns of battery cell recesses 205 as desired. Additionally, in other embodiments, each row may have more or fewer battery cell recesses 205 in each column. The columns are slightly offset so that adjacent columns of battery cell recesses 205 are staggered so that the midpoint of a battery cell recess 205 in one column is positioned near the top or the bottom of a battery cell recess 205 in the adjacent column.

The orientation of adjacent battery cell recesses 205 in a single row may be changed so that the positioning of the terminal openings 215 alternates. As an example, in FIG. 11, the terminal opening 215 of the battery cell recess 205 in the upper left corner of the tray 200 is positioned near the bottom edge of the battery cell recess 205. The battery cell recess 205 in the first row just below the battery cell recess 205 in the upper left corner of the tray 205 has the terminal opening 215 positioned near the top edge of the battery cell recess 205. Therefore, the terminal openings 215 of the first and second battery cell recesses 205 in the first row are near each other.

The dispensing nozzles 120 in the dispensing unit 100 may be arranged to correspond to the position of the battery cell recesses 205 on tray 200. For example, the dispensing unit 100 may include two rows of eight dispensing nozzles 120 with the two rows staggered similar to the battery cell recesses 205 on the tray 200, so that adhesive may be applied to the battery cell recesses 205 two columns at a time. Additionally, the dispensing nozzles may be oriented so that the semi-circular portion of the dispensing nozzle 120 that does not include dispensing ports 130 aligns with the battery terminal opening 215 defined through the ledge 210 of the battery cell recesses 205 in the tray 200. This prevents adhesive from being applied to the portion of the sidewall 208 above the battery terminal opening 215 so that the adhesive does not interfere with the connection between the battery cell inserted into the battery cell recess 205 and the battery terminal.

In use, the tray 200 is positioned with respect to the dispensing unit 100 so that that the first and second columns of battery cell recesses 205 are aligned with the dispensing nozzles 120 of the dispensing unit 100. The tray 200 may be moved into position manually, or by another means, such as by a conveyor system. The frame 105 of the dispensing unit 100 is then lowered so that the dispensing nozzles 120 are positioned within the battery cell recesses 205. As the dispensing nozzles 120 are lowered into the battery cell recesses 205, the projections 136 of the dispensing nozzle 120 prevent the dispensing ports 130 from contacting the sidewall 208 of the battery cell recess 205 and potentially being damaged.

Adhesive supplied to the dispensing nozzles 120 is thrown from the dispensing ports 130 of the dispensing nozzle 120 onto the sidewall 208 of the battery cell recess 205 in discrete droplets. It is disadvantageous to have adhesive be applied to the ledge 210 of the battery cell recess 205, as this could interfere with the function of the battery cell and the connection of the battery cell to the battery terminal through the battery terminal opening 215. However, because the adhesive is thrown from the dispensing ports 130 in discrete droplets, the release of adhesive into the battery cell recess 205 is able to be controlled more easily to avoid getting adhesive onto the ledge 210. Additionally, the metering valve 170 allows the amount of adhesive thrown from the dispensing ports 130 to be strictly controlled to prevent an excess amount of adhesive from being applied to the battery cell recess 205.

Figure 12A:
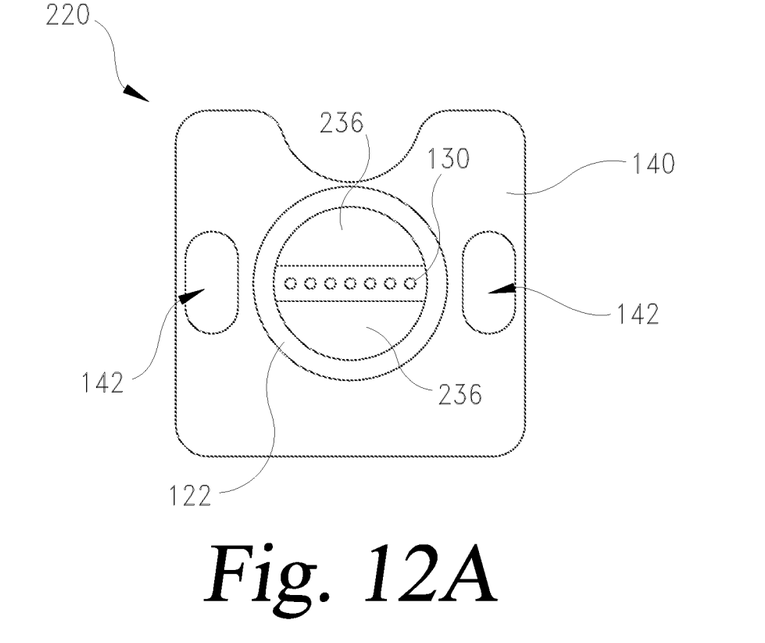
FIG. 12A is a top plan view of an embodiment of a dispensing nozzle.
Figure 12B:
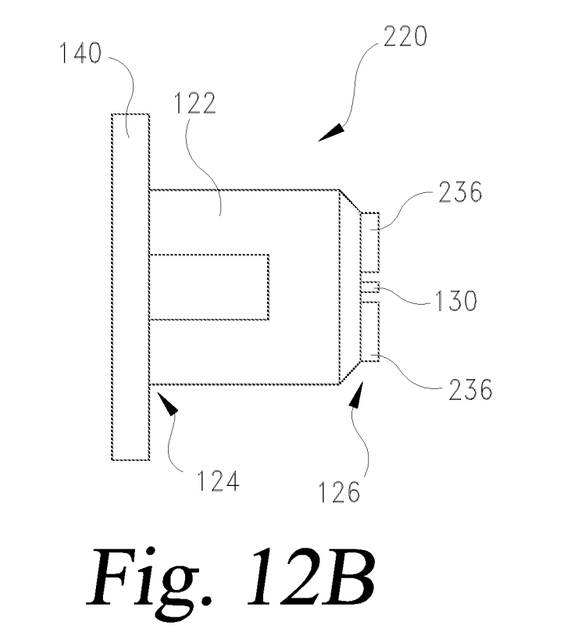
FIG. 12B is a side view of the dispensing nozzle of FIG. 10A.

An alternative embodiment of a dispensing nozzle 220 is shown in FIGS. 12A-12B. In this embodiment, the dispensing ports 130 are arranged linearly on an end or top surface of the nozzle body 122. Instead of the projections 136 being positioned between adjacent dispensing ports 130, the dispensing nozzle 220 includes two larger projections 236 with one projection 236 positioned on a one side of the linear row of dispensing ports 130 and the other projection 236 positioned on the opposite side of the linear row of dispensing ports 130. As shown in FIG. 12B, the projections 236 extend from the nozzle body 122 a distance that is substantially equal to or slightly less than the distance that the dispensing ports 130 extend from the nozzle body 122 so that the projections 236 protect the dispensing ports 130 from damage due to contacting an exterior surface. Similar to the dispensing nozzle 120, the number of dispensing ports 130 may be increased or decreased as desired. Additionally, the arrangement of the dispensing ports 130 may be modified as desired. For example, dispensing ports 130 may be arranged in two or more rows in a square or a rectangular pattern.

The terms "throw" or "dispense as a droplet", as used herein, refer to the act of a liquid droplet being ejected from the dispensing port of a dispensing nozzle by the application of pressure to the liquid to force the liquid through a dispensing port. In being thrown from the dispensing port, the liquid droplets are separated from the dispensing port as discrete droplets and propelled exteriorly of the dispensing nozzle across an air gap to a substrate. The pressure applied to eject the liquid droplet may be fluid pressure, air pressure, mechanical pressure, or any other suitable form of pressure.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A dispensing unit comprising:
a plurality of dispensing nozzles, wherein each dispensing nozzle comprises:
 a nozzle body including a nozzle body recess defined through said nozzle body, wherein said nozzle body recess is configured to receive adhesive;
 a plurality of adhesive dispensing ports extending from said nozzle body, wherein an interior end of each of said adhesive dispensing ports is in fluid communication with the nozzle body recess and an exterior end of each of said adhesive dispensing ports is exterior to said nozzle body;
 a plurality of projections extending from said nozzle body, wherein at least one of said projections is adjacent to each adhesive dispensing port; and
 wherein said each of said adhesive dispensing ports extends from the nozzle body at a distance that is at least equal to a distance that the at least one adjacent projection extends from said nozzle body;
a pressure source in communication with said nozzle body recesses ref said dispensing nozzles; and
wherein said adhesive dispensing ports throw adhesive in discrete droplets that separate from the nozzle body and that are propelled across an air gap between said nozzle body and a substrate.

2. The dispensing unit of claim 1, wherein said adhesive dispensing ports are arranged on said nozzle body in a semi-circular shape.

3. The dispensing unit of claim 1, wherein the exterior end of said adhesive dispensing ports has an interior tapered portion that extends outward to create a sharpened point.

4. The dispensing unit of claim 3, wherein the sharpened point of said adhesive dispensing ports has a circular cross section.

5. The dispensing unit of claim 1, wherein ten or more adhesive dispensing ports extend from said nozzle body.

6. The dispensing unit of claim 1, wherein the adhesive is dispensed laterally relative to a longitudinal axis of said nozzle body.

7. The dispensing unit of claim 1, wherein each of said adhesive dispensing ports is positioned between at least two adjacent projections.

8. The dispensing unit of claim 7, wherein said adhesive dispensing ports are aligned linearly on said nozzle body.

9. The dispensing unit of claim 8, wherein one of said projections is adjacent to each of the adhesive dispensing ports on one side of the line of adhesive dispensing ports, and another one of said projections is adjacent to each of the adhesive dispensing ports on an opposite side of the line of adhesive dispensing ports.

10. A dispensing unit comprising:
a frame;
a plurality of dispensing nozzles mounted to said frame, wherein each dispensing nozzle comprises:
 a nozzle body including a nozzle body recess defined through said nozzle body, wherein said nozzle body recess is configured to receive adhesive; and
 a plurality of adhesive dispensing ports extending from said nozzle body;
one or more adhesive supply tubes for supplying an adhesive to said dispensing nozzles;
one or more metering valves in fluid communication with said one or more adhesive supply tubes, wherein said one or more metering valves provide a discrete amount of adhesive to each of said dispensing nozzles when actuated;
a pressure source in communication with said nozzle body recesses of said dispensing nozzles capable of applying pressure to said metering valves; and
wherein said dispensing nozzles dispense the discrete amount of adhesive as discrete droplets that separate from said plurality of adhesive dispensing ports and which are thrown across an air gap onto a substrate upon application of pressure from said pressure source to said metering valves.

11. The dispensing unit of claim 10, further comprising:
an air reservoir configured to supply pressurized air to said metering valves to dispense adhesive from said dispensing nozzles.

12. The dispensing unit of claim 10, wherein said dispensing nozzles are arranged in two columns on said frame.

13. The dispensing unit of claim 10, wherein an exterior end of each of said plurality of adhesive dispensing ports has an interior tapered section that expands outward to form a sharpened point.

14. The dispensing unit of claim 10, wherein the discrete amount of adhesive provided to each of said dispensing nozzles is less than $0.20$ cm$^3$ per cycle.

15. The dispensing unit of claim 10,
wherein the adhesive is dispensed laterally relative to a longitudinal axis of said nozzle body.

16. A method comprising:
supplying a discrete amount of adhesive to a plurality of dispensing nozzles, wherein each dispensing nozzle includes a nozzle body recess defined through a nozzle body, and wherein each nozzle body includes:
a plurality of adhesive dispensing ports extending from said nozzle body;
a plurality of projections extending from said nozzle body;
wherein each of said adhesive dispensing ports is positioned between at least two of said projections; and
wherein each of said adhesive dispensing ports extends from the nozzle body at a distance that is at least equal to a distance that an adjacent projection extends from said nozzle body;
applying pressure to the adhesive within said nozzle body recess to dispense the discrete amount of adhesive from said plurality of adhesive dispensing ports of said nozzle bodies;
stopping application of pressure when the discrete amount of adhesive has been dispensed from said dispensing nozzles;
wherein the adhesive is dispensed from said plurality of adhesive dispensing ports in discrete droplets that separate from said plurality of adhesive dispensing ports and which are thrown across an air gap; and
wherein the adhesive is dispensed laterally relative to a longitudinal axis of said nozzle body.

17. The method of claim 16, further comprising:
supplying a discrete amount of adhesive to each dispensing nozzle using a metering valve.

18. The method of claim 17, wherein air pressure is used to trigger the metering valve to dispense the discrete amount of adhesive supplied to each dispensing nozzle.

19. The method of claim 16, wherein the adhesive dispensing ports are arranged in a semi-circular shape on said nozzle body of each of said dispensing nozzles.

20. The method of claim 16, wherein said dispensing nozzles are supported by a frame, and wherein said dispensing nozzles are arranged in two columns on said frame.

\* \* \* \* \*

UNITED STATES PATENT AND TRADEMARK OFFICE
CERTIFICATE OF CORRECTION

| | |
|---|---|
| PATENT NO. | : 12,005,474 B2 |
| APPLICATION NO. | : 17/650962 |
| DATED | : June 11, 2024 |
| INVENTOR(S) | : Floyd L. Kehl |

It is certified that error appears in the above-identified patent and that said Letters Patent is hereby corrected as shown below:

In the Claims

In Column 10, Line 11, it is requested that "ref" be replaced with --of--

In Column 10, Line 21, it is requested that "extends" be replaced with --expands--

Signed and Sealed this
Tenth Day of December, 2024

Katherine Kelly Vidal
*Director of the United States Patent and Trademark Office*